US010624363B2

(12) United States Patent
Rizvi et al.

(10) Patent No.: US 10,624,363 B2
(45) Date of Patent: Apr. 21, 2020

(54) PROCESS AND APPARATUS FOR RAPID FREEZING OF CONSUMABLE AND NON-CONSUMABLE PRODUCTS USING THE EXPANSION OF DENSE GAS

(71) Applicant: CORNELL UNIVERSITY, Ithaca, NY (US)

(72) Inventors: Syed S. H. Rizvi, Ithaca, NY (US); Michael E. Wagner, Sparkill, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 274 days.

(21) Appl. No.: 15/129,413

(22) PCT Filed: Mar. 27, 2015

(86) PCT No.: PCT/US2015/022913
§ 371 (c)(1),
(2) Date: Sep. 26, 2016

(87) PCT Pub. No.: WO2015/148882
PCT Pub. Date: Oct. 1, 2015

(65) Prior Publication Data
US 2017/0172174 A1 Jun. 22, 2017

Related U.S. Application Data

(60) Provisional application No. 61/971,228, filed on Mar. 27, 2014.

(51) Int. Cl.
*A23G 9/20* (2006.01)
*A23G 9/22* (2006.01)
(Continued)

(52) U.S. Cl.
CPC ............ *A23G 9/20* (2013.01); *A23G 9/04* (2013.01); *A23G 9/22* (2013.01); *A23L 3/361* (2013.01)

(58) Field of Classification Search
None
See application file for complete search history.

(56) References Cited

U.S. PATENT DOCUMENTS 3,068,105 A * 12/1962 Morrison ............... A23G 9/04
426/474
3,404,541 A * 10/1968 Yves Bot-Langlet .... A23G 9/06
34/410

(Continued)

FOREIGN PATENT DOCUMENTS

NL 1007219 C2 4/1999
WO 2012160532 A1 11/2012

OTHER PUBLICATIONS

International Searching Authority, International Search Report and Written Opinion issued in Counterpart International Application No. PCT/US2015/022913, dated Jul. 7, 2015.

*Primary Examiner* — Ljiljana V. Ciric
*Assistant Examiner* — Alexis K Cox
(74) *Attorney, Agent, or Firm* — FisherBroyles, LLP; Andrew K. Gonsalves, Esq.

(57) ABSTRACT

An apparatus for freezing products including an ejector venture system having a housing, an interior cavity, at least one port with a valve for releasing pressurized fluid into the interior cavity, at least one channel with a valve for introducing liquid product into the interior cavity, freezing liquid product by mixing it with expanding pressurized fluid.

23 Claims, 4 Drawing Sheets

(51) Int. Cl.
*A23L 3/36* (2006.01)
*A23G 9/04* (2006.01)

(56) References Cited

U.S. PATENT DOCUMENTS

| | | | |
|---|---|---|---|
| 3,470,706 A | 10/1969 | Mitchell et al. | |
| 3,507,757 A * | 4/1970 | Caubet | C23C 8/40 |
| | | | 148/220 |
| 4,440,319 A * | 4/1984 | Nitchman | B65D 77/06 |
| | | | 220/23.88 |
| 4,488,407 A * | 12/1984 | Delano | B01F 5/0256 |
| | | | 62/46.1 |
| 5,433,967 A | 7/1995 | Kateman et al. | |
| 5,603,257 A | 2/1997 | Kateman et al. | |
| 6,209,329 B1 * | 4/2001 | Jones | A23C 3/045 |
| | | | 62/377 |
| 6,284,302 B1 | 9/2001 | Berger et al. | |
| 6,406,730 B1 | 6/2002 | Banyard et al. | |
| 7,781,006 B2 | 8/2010 | Brisson, II et al. | |
| 8,182,853 B2 | 5/2012 | Puaud et al. | |
| 10,327,455 B2 * | 6/2019 | Gates | A23G 9/045 |
| 2003/0161933 A1 * | 8/2003 | Anderson | B67D 1/06 |
| | | | 426/592 |
| 2008/0011009 A1 | 1/2008 | Timmons et al. | |
| 2011/0000229 A1 * | 1/2011 | Boekhoorn | A47J 31/402 |
| | | | 62/56 |

* cited by examiner

PROCESS AND APPARATUS FOR RAPID FREEZING OF CONSUMABLE AND NON-CONSUMABLE PRODUCTS USING THE EXPANSION OF DENSE GAS

CROSS-REFERENCE TO RELATED APPLICATIONS

This application claims priority benefit of U.S. Provisional Patent Application Ser. No. 61/971,228, filed Mar. 27, 2014.

FIELD OF THE INVENTION

The present invention relates to, inter alia, processes and apparatuses for rapid freezing of consumable and non-consumable products. The present invention also relates to the consumable and non-consumable products produced by the processes and apparatuses disclosed herein.

BACKGROUND OF THE INVENTION

In conventional ice cream production, liquid ice cream mix is pumped through a scraped surface heat exchanger. Vaporizing refrigerant (typically approximately −30° C.) in the jacket surrounding the heat exchanger barrel allows for energy transfer out of the mix, resulting in the formation of ice crystals. These ice crystals are scraped from the internal surface of the heat exchanger by rotating blades and collected in the center of the freezer barrel where the ice crystals grow to a mean size of 30-35 µm. The rotating blades also introduce air into the mix through whipping. Pressurized air can also be introduced into the freezer in order to aid in whipping. These freezers can be constructed as batch or continuous operations and the ice cream is usually drawn from the freezer in a partially frozen state so that it is still flowable. Many variations of these types of systems are available commercially.

Regardless of the system, several parameters are critical to the end quality of the ice cream including ice crystal formation, air incorporation, air cell formation, and fat globule destabilization. Ice crystal formation is heavily influenced by the freezing process. In order to keep ice crystals in the desirable range for optimal eating quality, freezing must promote the formation of ice crystal nuclei, but limit crystal growth. Practically, high nucleation rates can be achieved by rapid freezing with low temperature refrigeration (≤−30° C.). Minimizing crystal growth is more complicated and less well understood, but minimizing residence time in the freezer barrel is one accepted approach.

The present invention is directed to overcoming these and other deficiencies in the art.

SUMMARY OF THE INVENTION

The present disclosure provides, inter alia, processes and apparatuses for rapid freezing of consumable and non-consumable products. In certain embodiments, the processes and apparatuses of the present disclosure yield the rapidly frozen consumable and non-consumable products using the expansion of dense gas. The present disclosure also provides consumable and non-consumable products produced by the processes and apparatuses disclosed herein.

In one aspect, the present disclosure provides an apparatus for preparing a consumable frozen product.

The apparatus includes an ejector venturi system having a housing, an outer surface and an inner surface, an interior cavity, at least one port extending from the outer surface to the interior cavity, the at least one port having a nozzle positioned within the interior cavity, and at least one channel having a first end and a second end, the at least one channel extending from the outer surface to the interior cavity.

The apparatus also includes at least one valve coupled to the at least one port for regulating passage of pressurized inert gas into the interior cavity, and at least one valve coupled to the first end of the at least one channel, for regulating the flow of a liquid consumable product mix, the second end of the at least one channel positioned proximate to the at least one port on the inner surface of the housing.

According to an apparatus of the present disclosure, when the at least one valve coupled to the at least one port and the at least one valve coupled to the first end of the at least one channel are open, the liquid consumable product mix contacts the stream of inert gas within the interior cavity.

In one embodiment, the apparatus further comprises a high pressure gas storage container engaged with the ejector venturi system.

In another aspect, the present disclosure provides a method of producing a consumable frozen product. This method includes the steps of: (i) releasing a pressurized inert gas into an ejector venturi system having a housing, an outer surface and an inner surface, an interior cavity, at least one port extending from the outer surface to the interior cavity, the at least one port having a nozzle positioned within the interior cavity, and at least one channel having a first end and a second end, the at least one channel extending from the outer surface to the interior cavity, such that the releasing of the pressurized inert gas through the at least one nozzle creates negative pressure as the inert gas expands within the interior cavity; and (ii) drawing a liquid consumable product mix into the interior cavity of the ejector venturi system through the at least one channel, wherein the flow of the liquid consumable product mix is regulated by at least one valve coupled to the first end of the at least one channel, wherein when the pressurized inert gas is released and the liquid consumable product mix is drawn into the interior cavity of the ejector venturi system, the liquid consumable product mix is atomized into droplets upon contact with the expanding inert gas and the atomized droplets are frozen.

In yet another aspect, the present disclosure provides a consumable frozen product produced according to the method described herein.

In another aspect, the present disclosure provides an apparatus for preparing a non-consumable frozen product.

In one embodiment, this apparatus includes an ejector venturi system having a housing, an outer surface and an inner surface, an interior cavity, at least one port extending from the outer surface to the interior cavity, the at least one port having a nozzle positioned within the interior cavity, and at least one channel having a first end and a second end, the at least one channel extending from the outer surface to the interior cavity.

In this embodiment, the apparatus also includes at least one valve coupled to the at least one port for regulating passage of pressurized inert gas into the interior cavity, and at least one valve coupled to the first end of the at least one channel, for regulating the flow of a liquid non-consumable product mix, the second end of the at least one channel positioned proximate to the at least one port on the inner surface of the housing.

Further, in accordance with this embodiment of an apparatus of the present disclosure, when the at least one valve coupled to the at least one port and the at least one valve coupled to the first end of the at least one channel are open, the liquid non-consumable mix contacts the stream of inert gas within the interior cavity.

In particular embodiments of this apparatus, the apparatus further comprises a high pressure gas storage container engaged with the ejector venturi system.

In a further aspect, the present disclosure provides a method of producing a non-consumable frozen product. This method includes the steps of: (i) releasing a pressurized inert gas into an ejector venturi system having a housing, an outer surface and an inner surface, an interior cavity, at least one port extending from the outer surface to the interior cavity, the at least one port having a nozzle positioned within the interior cavity, and at least one channel having a first end and a second end, the at least one channel extending from the outer surface to the interior cavity, such that the releasing of the pressurized inert gas through the at least one nozzle creates negative pressure as the inert gas expands within the interior cavity; and (ii) drawing a liquid non-consumable product mix into the interior cavity of the ejector venturi system through the at least one channel, wherein the flow of the liquid non-consumable product mix is regulated by at least one valve coupled to the first end of the at least one channel, wherein when the pressurized inert gas is released and the liquid non-consumable product mix is drawn into the interior cavity of the ejector venturi system, the liquid non-consumable product mix is atomized into droplets upon contact with the expanding inert gas and the atomized droplets are frozen.

In yet another aspect, the present disclosure provides a non-consumable frozen product produced according to the related method described herein.

When most gases expand adiabatically, their temperature will drop due to the Joule-Thompson effect. Joule-Thompson processes, also called throttling processes, typically involve the flow of a pressurized fluid through an orifice to a lower pressure state. In one embodiment, the present invention allows for near instantaneous freezing of ice cream by taking advantage of the Joule-Thompson effect. Favorable crystal formation is achieved due to the near instantaneous freezing process.

Thus, according to various aspects, the present disclosure provides a process and apparatus for the production of ice cream and related products using the expansion of dense gas. A pressurized gas is expanded through an ejector venturi system. Liquid ice cream mix or a related type product is drawn into the ejector, atomized, and frozen by the expanding gas, resulting in the production of ice cream with a certain volume of incorporated gas and creamy texture due to quick freezing and formation of very small ice crystals. These ice crystals can have a size of less than 50 μm, which is smaller than those made by current ice cream producing practices.

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

DETAILED DESCRIPTION OF THE INVENTION

In the following description, reference is made to the accompanying drawings that form a part hereof, and in which is shown by way of illustration specific embodiments which may be practiced. These embodiments are described in detail to enable those skilled in the art to practice the invention, and it is to be understood that other embodiments may be utilized and that any structural, logical, and electrical changes may be made without departing from the scope of the present invention. The following description of example embodiments is, therefore, not to be taken in a limited sense, and the scope of the present invention is defined by the appended claims.

The present disclosure relates to, inter alia, processes and apparatuses for rapid freezing of consumable and non-consumable products. In certain embodiments, the processes and apparatuses of the present disclosure yield the rapidly frozen consumable and non-consumable products using the expansion of dense gas. The present disclosure also relates to the consumable and non-consumable products produced by the processes and apparatuses disclosed herein. As described in more detail herein, the processes and apparatuses of the present disclosure involve the expansion of dense gas to produce the consumable and non-consumable products described herein.

Consumable Products

As described herein, the present disclosure provides an apparatus for preparing consumable frozen products, a method of producing the consumable frozen products, and the consumable frozen products produced by the method. As used herein, a consumable frozen product includes, without limitation, frozen desserts such as ice cream, as well as frozen-style beverages such as slush beverages. However, the term consumable frozen product as used in the present disclosure is not limited to frozen desserts or frozen-style beverages, but also refers to any edible frozen product that can be produced according to the apparatus and process described herein, particularly where expansion of dense gas and rapid freezing is involved in producing the consumable frozen product. Further examples of consumable frozen products of the present disclosure are described in more detail herein below.

One embodiment of an apparatus 10 for preparing a consumable frozen product 60 (also 11) as described herein, and embodying the principles and concepts of the present disclosure, is illustrated in FIGS. 1-4 and described below.

Figure 1:
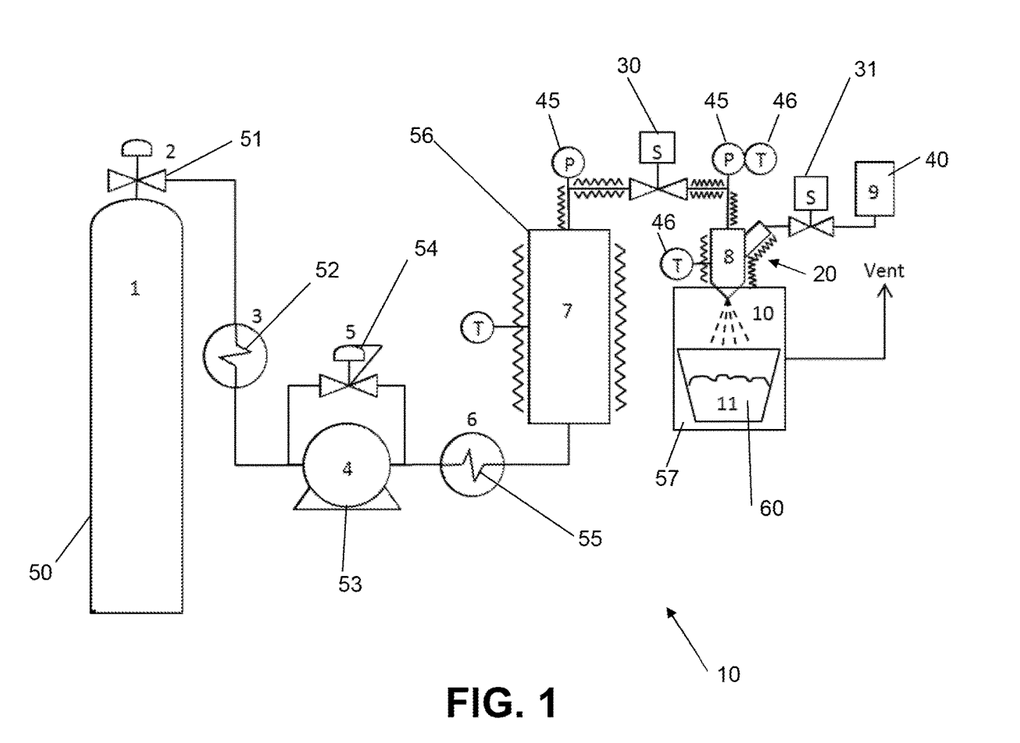
FIG. 1 is a schematic diagram of one embodiment of a system used to produce ice cream with dense gas. The system shown in FIG. 1 includes the following components: (1) a carbon dioxide ($CO_2$) reservoir; (2) a valve; (3) a cooler; (4) a high pressure pump; (5) a back pressure regulator; (6) a preheater; (7) a high pressure gas storage vessel; (8) an ejector venturi system; (9) a liquid ice cream mix; (10) a collection chamber; and (11) a collected frozen product. P=pressure gauge, T=Thermocouple, S=solenoid valve, and a zig-zag line represents a thermally controlled zone.

As illustrated in FIG. 1, the compressed inert gas may be generated using a conventional system. FIG. 1 provides a schematic diagram of one embodiment of an apparatus 10 for preparing a consumable frozen product 60 (also 11), comprising a $CO_2$ reservoir 50 with a valve 51, a cooler 52, a high pressure pump 53, a back pressure regulator 54, a preheater/heat exchanger 55, a high pressure gas storage vessel 56, timed solenoid valves 30, 31, an ejector venturi system 20, and a collection chamber 57. One or more timer(s) 44 (see FIG. 2), pressure gauge(s) 45, thermocouple(s) 46, and additional solenoid valves 47 (see FIG. 2) may be used in apparatus 10.

In one embodiment, liquid $CO_2$ is passed through a cooler 52 at −5° C. and then pumped compressed using a high pressure pump 53 into a high pressure gas storage vessel 56. A heat exchanger 55 may be used to modify the temperature of the high pressure gas before it enters the high pressure gas storage vessel 56. The pressure may be maintained using a back pressure regulator 54. Pressurized carbon dioxide ($CO_2$) 43 (see FIG. 2) is released from the high pressure gas storage vessel 56 with a timed solenoid valve 30, which then passes through the nozzle 26 (see FIG. 2) into the interior cavity 24 (see FIG. 2) of the ejector venturi system 20.

Figure 2:
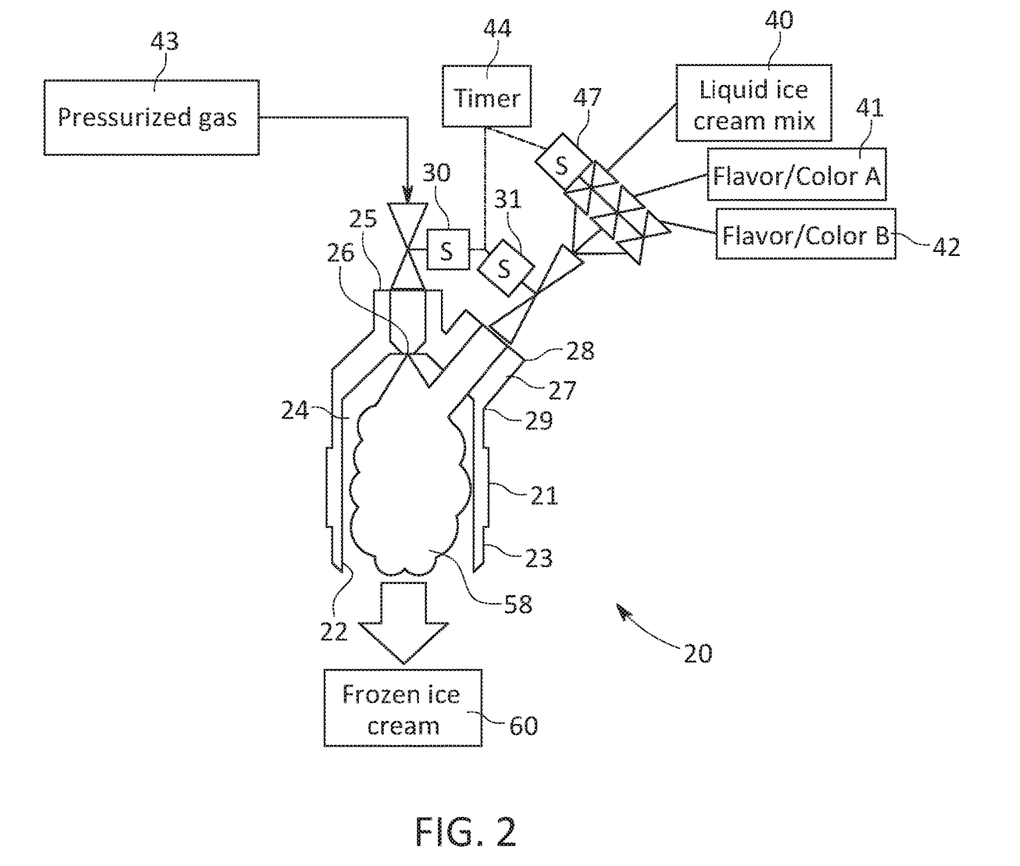
FIG. 2 is a schematic diagram of one embodiment of an ejector venturi system of the present disclosure with multiple liquid inlets for ice cream production. S=solenoid valve.

As illustrated in FIG. 2, the ejector venturi system 20 may comprise a housing 21, an outer surface 23 and an inner surface 22, an interior cavity 24, at least one port 25 extending from the outer surface 23 to the interior cavity 24, the at least one port 25 having a nozzle 26 positioned within the interior cavity 24, and at least one channel 27 having a first end 28 and a second end 29, the at least one channel 27 extending from the outer surface 23 to the interior cavity 24. The at least one port 25 of the ejector venturi system 20 is coupled to at least one valve 30 positioned proximate to the outer surface 23 for regulating the passage of pressurized inert gas (e.g., $CO_2$ 43) into the interior cavity 24. The at least one port 25 may be threaded, into which a nozzle 26 may be inserted.

The first end 28 of at least one channel 27 of the ejector venturi system 20 is coupled to at least one valve 31 positioned proximate to the outer surface 23 for regulating the flow of a liquid consumable product mix 40. The second end 29 of at least one channel 27 may be positioned within the interior cavity 24, such that it is proximate to the nozzle 26 threaded into the at least one port 25.

The passage of a pressurized inert gas (e.g., $CO_2$ 43) into the interior cavity 24 is coordinated with the flow of a liquid consumable product mix 40 into the interior cavity 24 of the ejector venturi system 20. The expansion of the inert gas within the interior cavity 24 draws the liquid consumable product mix 40 into the interior cavity 24, and atomizes the liquid consumable product mix 40 into droplets and freezes the droplets. In one embodiment, the second end 29 of at least one channel 27 is positioned relative to the nozzle 26, such that the liquid consumable product mix 40 contacts the inert gas at the vena contracta of the expanding inert gas stream when the liquid consumable product mix 40 is drawn into the interior cavity 24. The frozen droplets 58 are collected in a collection chamber 57 (see FIG. 1) as the frozen droplets 58 leave the interior cavity 24 and become a final frozen consumable product 60.

Flavoring elements 41, coloring materials 42, and any other fluid of suitable viscosity may be introduced into the at least one channel 27 for flow into the interior cavity 24 and mixed into the final frozen consumable product 60. The flow into the interior cavity 24 may be regulated by additional solenoid valves 47 and may be timed with a timer 44.

The ejector venturi system 20 may be fabricated from any material capable of high pressure operation, including, but not limited to, stainless steel, quartz, tungsten, and the like.

The at least one valve 30 coupled to at least one port 25 and at least one valve 31 coupled to the first end 28 of the at least one channel 27 may be any electromechanically operated valve, and preferably a timed solenoid valve.

In another aspect, provided herein is a method of producing a frozen consumable product including releasing a pressurized inert gas (e.g., $CO_2$ 43) into an ejector venturi system 20 comprising a housing 21, an outer surface 23 and an inner surface 22, an interior cavity 24, at least one port 25 extending from the outer surface 23 to the interior cavity 24, the at least one port 25 having a nozzle 26 positioned within the interior cavity 24, and at least one channel 27 having a first end 28 and a second end 29, the at least one channel 27 extending from the outer surface 23 to the interior cavity 24, such that the releasing of the pressurized inert gas through the at least one nozzle 26 creates negative pressure as the inert gas expands within the interior cavity 24. A liquid consumable product mix 40 is drawn into the interior cavity 24 of the ejector venturi system 20 through the at least one channel 27 regulated by at least one valve 31 coupled to the first end 28 of the at least one channel 27. When the pressurized inert gas is released and the liquid consumable product mix 40 is drawn into the interior cavity 24 of the ejector venturi system 20, the liquid consumable product mix 40 is atomized into droplets upon contact with the expanding inert gas and the atomized droplets are frozen.

In one aspect, the present disclosure provides an apparatus for preparing a frozen dessert product.

In another aspect, the present disclosure provides an apparatus for preparing a slush beverage product.

In one embodiment, the apparatus further comprises a high pressure gas storage container 56 engaged with the ejector venturi system 20.

As used herein, the inert gas may be any food grade gas. A suitable inert gas for use with the apparatus and method of the present disclosure may include, without limitation, carbon dioxide ($CO_2$), oxygen, air, and nitrogen. One embodiment uses high pressure $CO_2$ (ranging from 1000-5000 psig), but any food grade gas that undergoes Joule-Thompson cooling would be suitable.

In one embodiment of the apparatus of the present disclosure, at least one valve 30 coupled to the at least one port 25 is a timed solenoid valve.

In one embodiment of the apparatus of the present disclosure, at least one valve 31 coupled to the first end of the at least one channel 27 is a timed solenoid valve.

In one embodiment of the method of the present disclosure, additional timed solenoid valves 47 regulate the flow of flavoring elements 41, coloring materials 42, and any other fluid of suitable viscosity into the at least one channel 27 for flow into the interior cavity 24.

In one embodiment of the method of the present disclosure, the pressurized inert gas is pressurized between 500 psig and 5000 psig or between about 1000 psig and 5000 psig.

In another embodiment of the method of the present disclosure, the pressurized inert gas is pressurized between 1500 psig and 2000 psig.

In another embodiment of the method of the present disclosure, the size of the frozen atomized droplets are between 20-100 microns, between about 20-90 microns, between about 20-80 microns, between about 20-70 microns, between about 20-60 microns, or less than 50 microns.

In yet another aspect, the present disclosure provides a consumable frozen product produced according to the method described herein.

In accordance with the present disclosure, a consumable frozen product produced using the apparatus and method of the present disclosure can include, without limitation, ice cream, gelato, frozen yogurt, sherbet, frozen coffee beverage, frozen alcoholic beverage, flavored frozen beverage (e.g., a slushie), or any other frozen-style dessert and slush-style beverage.

The ejector venturi system (FIG. 2) is rated for high pressure operation. The high pressure $CO_2$ passes through a nozzle, which may be inserted into a threaded port within the interior cavity of the ejector venturi system. The liquid ice cream mix is drawn into the interior cavity through stainless steel tubing via the channel that may be positioned on the side of the housing of the ejector venturi system. The flow of the liquid ice cream mix is regulated by a timed solenoid valve that opens in conjunction with the solenoid valve that allows the high pressure $CO_2$ into the interior cavity of the ejector venturi system, passing through the nozzle. The second end of the channel is positioned at the vena contracta of the expanding $CO_2$ stream.

As the high pressure gas expands through the nozzle, the high velocity generates a negative pressure, which creates suction on the channel for the liquid ice cream mix. With the solenoid valve open, the liquid ice cream mix is drawn through the channel and atomized into droplets in the expanding gas stream. The expanding gas stream also drops in temperature rapidly, freezing the atomized ice cream mix droplets. These frozen ice cream mix droplets are then collected in a collection chamber positioned below the ejector venturi system housing. Both air and $CO_2$ are incorporated into the frozen mass during this process, resulting in frozen foam (e.g. ice cream). Using certain embodiments of food grade gas, such as $CO_2$, the production of an ice cream with a fizz (e.g., fizzy ice cream) can be produced.

Other variations of the apparatus and method of the present disclosure use a single charged canister to produce frozen ice cream instantly from room temperature storage. The pressurized canister would contain both liquid ice cream mix and propellant gas ($CO_2$ or any suitable food grade gas that undergoes Joule-Thompson cooling). A valve would regulate the flow of the liquid ice cream mix/pressurized gas out of the canister.

The canisters could be placed in a stationary distribution unit, not unlike soft serve ice cream machine. Further, the present disclosure provides for even smaller scale-sized apparatuses, such as those embodiments that are for in-home use. Manual operation at the stationary unit interface would open the valve and deliver the ice cream mix to a desired container. The system has the flexibility to use multiple prepared flavors or on site flavor preparation by mixing the ice cream mix with a flavor concentrate before being drawn through the venturi device.

One advantage to this apparatus and method is that the canisters can be stored at room and ice cream production would be instant. This is in comparison to conventional soft serve ice cream machines, which operate using scraped surface heat exchangers and require a substantial amount of time to free the ice cream mix.

Non-Consumable Products

The present disclosure also provides an apparatus for preparing non-consumable frozen products, a method of producing the non-consumable frozen products, and the non-consumable frozen products produced by the method. As used herein, the term non-consumable frozen product refers to any non-edible frozen product that can be produced according to the apparatus and method described herein, particularly where expansion of dense gas and rapid freezing is involved in producing the non-consumable frozen product. By way of example, a non-consumable product of the present invention can include, without limitation, items such as ice packs made with ethylene or diethylene glycol or a mixture of rubbing alcohol and water in freezer bags.

In one embodiment, this apparatus includes an ejector venturi system having a housing, an outer surface and an inner surface, an interior cavity, at least one port extending from the outer surface to the interior cavity, the at least one port having a nozzle positioned within the interior cavity, and at least one channel having a first end and a second end, the at least one channel extending from the outer surface to the interior cavity.

In this embodiment, the apparatus also includes at least one valve coupled to the at least one port for regulating passage of pressurized inert gas into the interior cavity, and at least one valve coupled to the first end of the at least one channel, for regulating the flow of a liquid non-consumable product mix, the second end of the at least one channel positioned proximate to the at least one port on the inner surface of the housing.

Further, in accordance with this embodiment of an apparatus of the present disclosure, when the at least one valve coupled to the at least one port and the at least one valve coupled to the first end of the at least one channel are open, the liquid non-consumable mix contacts the stream of inert gas within the interior cavity.

In particular embodiments of this apparatus, the apparatus further comprises a high pressure gas storage container engaged with the ejector venturi system.

In a further aspect, the present disclosure provides a method of producing a non-consumable frozen product. This method includes the steps of: (i) releasing a pressurized inert gas into an ejector venturi system having a housing, an outer surface and an inner surface, an interior cavity, at least one port extending from the outer surface to the interior cavity, the at least one port having a nozzle positioned within the interior cavity, and at least one channel having a first end and a second end, the at least one channel extending from the outer surface to the interior cavity, such that the releasing of the pressurized inert gas through the at least one nozzle creates negative pressure as the inert gas expands within the interior cavity; and (ii) drawing a liquid non-consumable product mix into the interior cavity of the ejector venturi system through the at least one channel, wherein the flow of the liquid non-consumable product mix is regulated by at least one valve coupled to the first end of the at least one channel, wherein when the pressurized inert gas is released and the liquid non-consumable product mix is drawn into the interior cavity of the ejector venturi system, the liquid non-consumable product mix is atomized into droplets upon contact with the expanding inert gas and the atomized droplets are frozen.

In yet another aspect, the present disclosure provides a non-consumable frozen product produced according to the related method described herein.

Various Uses and Unique Features of the Apparatus and Process of the Present Disclosure In various aspects, the process of the present disclosure is likely to be used for the institutional and/or industrial production of ice cream. The present disclosure can also be implemented into a vending system. In another embodiment, a single use canister could be used as an installation at most kinds of food venues. In yet another embodiment, a single use canister could be used for individual, on demand home use, similar to at-home, single serving coffee makers.

This process has been developed for the freezing of ice cream, but it could theoretically be used to quickly freeze any liquid for food, drink, or non-food purposes. Applications could extend into the biomedical field, where rapid liquid freezing may be advantageous.

In exemplary embodiments of an apparatus and method of the present disclosure, the dense gas used was $CO_2$ at 1500 to 2000 psig, but this pressure range could extend down to 500 psig and up to 5000 psig. The system used to generate the high pressure $CO_2$ (see FIG. 1) was maintained at 30° C., but could range from 20° C. to 60° C. As one example, vanilla ice cream base (e.g. the liquid ice cream mix) was created by melting the ice cream at room temperature to a liquid state, or alternatively ice cream base may be purchased. The suction line (e.g. the tubing that is engaged with the channel of the ejector venturi system) was placed into the liquefied ice cream. The solenoid valve was opened for 1, 2, or 3 seconds and off for 30 seconds, but this timing can be varied by those skilled in the art.

Figure 3:
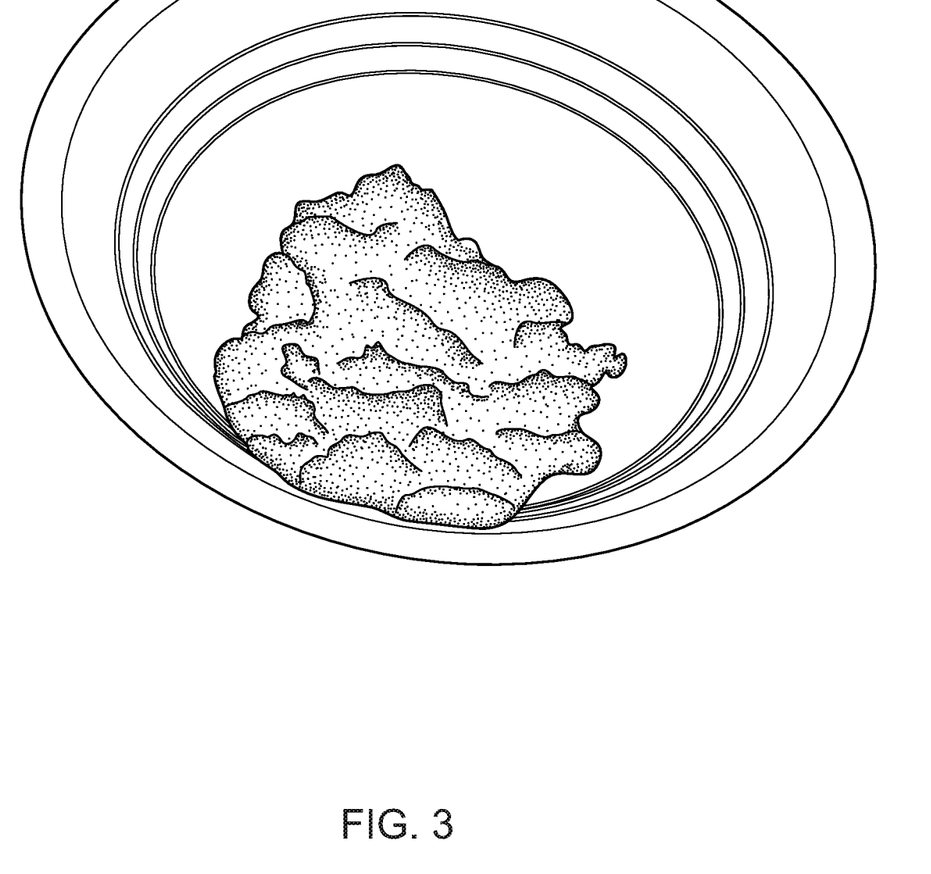
FIG. 3 is a drawing of an example of an ice cream product produced using one embodiment of a dense gas method of the present disclosure.
Figure 4:
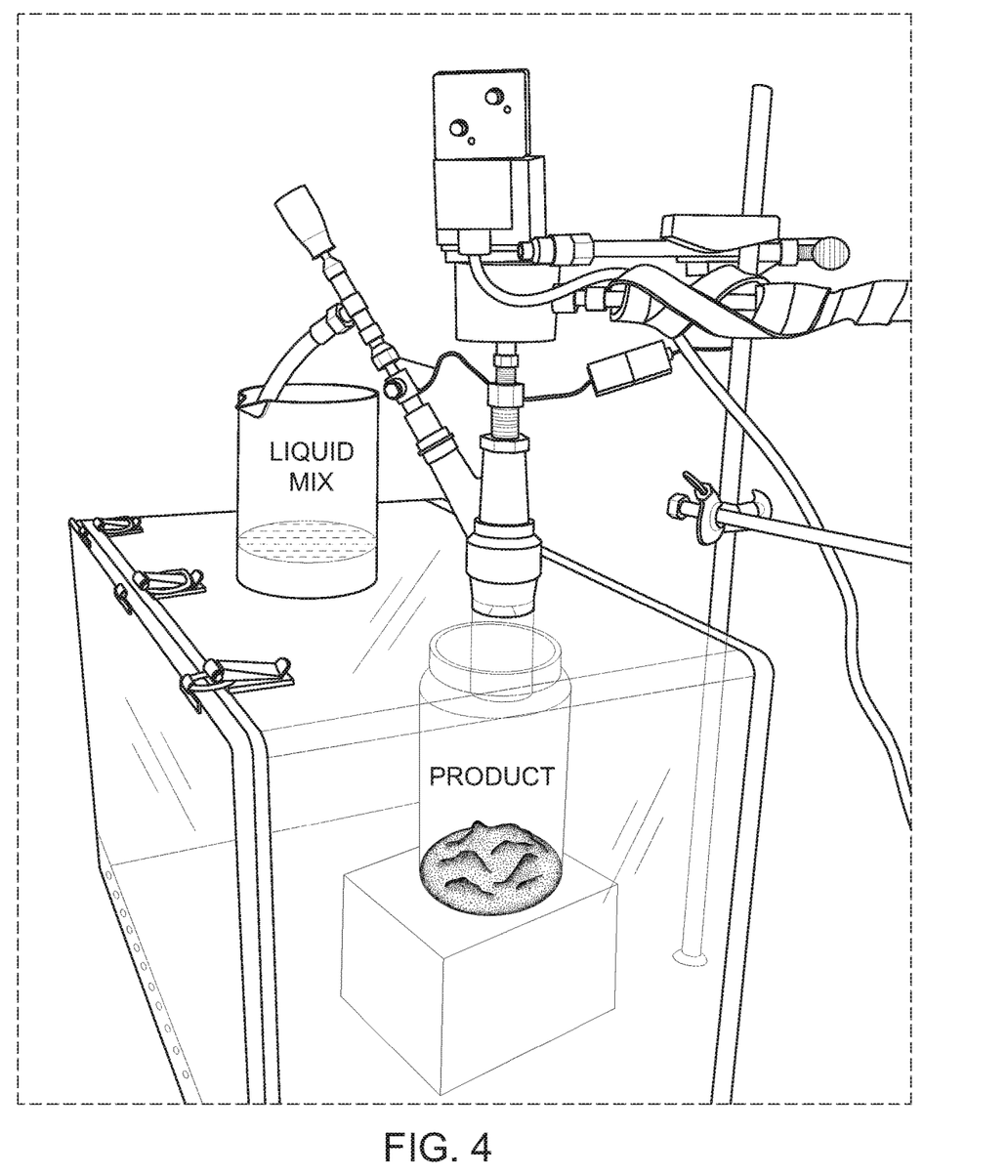
FIG. 4 is a drawing of a close-up view of one embodiment of an ejector venturi system of the present disclosure.

At 2000 psig, frozen ice cream mix was sprayed directly from the ejector and collected (see FIG. 3). The mass of ice cream produced increased proportionally with the duration of valve opening time, as expected, but continuous operation could require a higher capacity pump. Overrun, the proportion of air incorporated into ice cream during the freezing process, was determined in order to compare the produced ice cream with commercially available ice cream. Overrun measurements on the ice cream were made using a fixed volume bore. In this current version, the dense gas method produced ice cream with an overrun of 20-40%, which is comparable to commercial premium ice creams. A close-up of the system is shown in FIG. 4.

The process of the present disclosure is unique for a number of reasons, some of which are provided below.

First, in certain embodiments of the process, freezing takes place instantly from room temperature liquid ice cream mix or base. The Joule-Thompson effect associated with throttling a gas from high pressure to lower pressure induces a very rapid temperature drop. The process temperature drops almost instantaneously below −30° C. and the extent to which the temperature drops is dependent on the process conditions. Because the ice cream mix is directly exposed to the cold gas, little energy is lost to contact surfaces (such as the barrel of a conventional scraped surface heat exchanger). Further, in accordance with the present disclosure, the base (e.g., ice cream base) does not need to be precooled.

Second, the process does not require the use of additional pressurized gas to convey the fluid to be frozen. For example, one advantage of the process of the present disclosure is that it does not require a gas stream to move the liquid base to the freezing chamber.

Third, under the process, other fluids, such as concentrated flavors or colors, can be drawn in simultaneously through a manifold along with the liquid ice cream mix.

Fourth, the process can be operated on a semi-continuous basis or as a batch process with one time use cartridges.

Fifth, there are no moving parts in the apparatus itself. This makes the apparatus (device) easier to maintain than conventional scraped surface heat exchangers. The apparatus (device) is also easier to clean than conventional scraped surface heat exchangers.

Sixth, the final ice cream product has unique characteristics. For example, there is the potential for "fizzy ice cream" due to dissolved gas. Further, other gases and air may also be incorporated in the process.

Although the present invention has been described for the purpose of illustration, it is understood that such detail is solely for that purpose and variations can be made by those skilled in the art without departing from the spirit and scope of the invention which is defined by the following claims.

What is claimed is:

1. An apparatus for preparing a consumable frozen product, said apparatus comprising:
   (a) an ejector venturi system comprising:
      (i) a housing,
      (ii) an outer surface and an inner surface,
      (iii) an interior cavity,
      (iv) at least one port adapted for releasing a pressurized fluid into the interior cavity, said at least one port extending from the outer surface to the interior cavity and having a nozzle positioned within the interior cavity, wherein said nozzle is configured so that releasing the pressurized fluid through the nozzle produces negative pressure and allows the pressurized fluid to expand within the interior cavity, and
      (v) at least one channel adapted for introducing a liquid consumable product into the interior cavity, wherein said at least one channel has a first end and a second end, extends from the outer surface to the interior cavity, and is positioned proximate to the nozzle so that the negative pressure produced by the expanding pressurized fluid creates suction on the at least one channel sufficient to draw the liquid consumable product into the interior cavity without the need of gravity or positive pressure;
   (b) at least one valve coupled to the at least one port for regulating passage of the pressurized fluid into the interior cavity; and
   (c) at least one valve coupled to the first end of the at least one channel, for regulating the flow of the liquid consumable product, the second end of the at least one channel positioned proximate to the at least one port on the inner surface of the housing,
   wherein when the at least one valve coupled to the at least one port and the at least one valve coupled to the first end of the at least one channel are open, the liquid consumable product contacts the stream of expanding pressurized fluid within the interior cavity.

2. The apparatus in accordance with claim 1 further comprising:
   a high pressure gas storage container engaged with the ejector venturi system.

3. The apparatus in accordance with claim 1, wherein the pressurized fluid is an inert gas comprising any food grade gas.

4. The apparatus in accordance with claim 1, wherein the pressurized fluid is carbon dioxide.

5. The apparatus in accordance with claim 1, wherein the pressurized fluid is oxygen.

6. The apparatus in accordance with claim 1, wherein at least one valve coupled to the at least one port is a timed solenoid valve.

7. The apparatus in accordance with claim 1, wherein at least one valve coupled to the first end of the at least one channel is a timed solenoid valve.

8. The apparatus in accordance with claim 1, wherein the nozzle and the at least one channel of the ejector venturi system are positioned relative to one another so that the liquid consumable product contacts the pressurized fluid at the vena contracta of the pressurized fluid as it expands in the interior cavity.

9. A method of producing a consumable frozen product, said method comprising the steps of:
   (a) providing an apparatus according to claim 1;
   (b) releasing a pressurized fluid into the ejector venturi system of the apparatus, wherein the releasing of the pressurized fluid through the nozzle creates negative pressure and the pressurized fluid expands within the interior cavity, thereby causing a rapid drop in temperature of the expanding pressurized fluid; and
   (c) drawing a liquid consumable product into the interior cavity of the ejector venturi system through the at least one channel so that the liquid consumable product contacts a stream of the expanding pressurized fluid within the interior cavity, thereby yielding the consumable frozen product,
   wherein the negative pressure produced by the expanding pressurized fluid creates suction on the at least one channel sufficient to draw the liquid consumable product into the interior cavity without the need of gravity or positive pressure,
   wherein the flow of the liquid consumable product is regulated by at least one valve coupled to the first end of the at least one channel,
   wherein when the pressurized fluid is released and the liquid consumable product is drawn into the interior cavity of the ejector venturi system, the liquid consumable product is atomized into droplets upon contact with the expanding pressurized fluid and the atomized droplets are frozen.

10. The method in accordance with claim 9, wherein the at least one valve regulating the at least one nozzle is a timed solenoid valve.

11. The method in accordance with claim 9, wherein the pressurized fluid is an inert gas comprising any food grade gas.

12. The method in accordance with claim 9, wherein the pressurized fluid is carbon dioxide.

13. The method in accordance with claim 9, wherein the pressurized fluid is oxygen.

14. The method in accordance with claim 9, wherein the pressurized fluid is pressurized between 500 psig and 5000 psig or between about 1000 psig and 5000 psig.

15. The method in accordance with claim 14, wherein the pressurized fluid is pressurized between 1500 psig and 2000 psig.

16. The method in accordance with claim 9, wherein the size of the frozen atomized droplets are between 20-100 microns, between about 20-90 microns, between about 20-80 microns, between about 20-70 microns, between about 20-60 microns, or less than 50 microns.

17. The method in accordance with claim 9, wherein the consumable frozen product is selected from the group consisting of ice cream, gelato, frozen yogurt, sherbet, frozen coffee beverage, frozen alcoholic beverage, and flavored frozen beverage.

18. A consumable frozen product produced according to the method of claim 9.

19. The consumable frozen product in accordance with claim 18, wherein the pressurized fluid used in the method is carbon dioxide so that the consumable frozen product comprises the carbon dioxide and is fizzy.

20. An apparatus for preparing a non-consumable frozen product, said apparatus comprising:
   (a) an ejector venturi system comprising:
      (i) a housing,
      (ii) an outer surface and an inner surface,
      (iii) an interior cavity,
      (iv) at least one port adapted for releasing a pressurized fluid into the interior cavity, said at least one port extending from the outer surface to the interior cavity and having a nozzle positioned within the interior cavity, wherein said nozzle is configured so that releasing the pressurized fluid through the nozzle produces negative pressure and allows the pressurized fluid to expand within the interior cavity, and
      (v) at least one channel adapted for introducing a liquid non-consumable product into the interior cavity, wherein said at least one channel has a first end and a second end, extends from the outer surface to the interior cavity, and is positioned proximate to the nozzle so that the negative pressure produced by the expanding pressurized fluid creates suction on the at least one channel sufficient to draw the liquid non-consumable product into the interior cavity without the need of gravity or positive pressure;
   (b) at least one valve coupled to the at least one port for regulating passage of the pressurized fluid into the interior cavity; and
   (c) at least one valve coupled to the first end of the at least one channel, for regulating the flow of the liquid non-consumable product, the second end of the at least one channel positioned proximate to the at least one port on the inner surface of the housing,
   wherein when the at least one valve coupled to the at least one port and the at least one valve coupled to the first end of the at least one channel are open, the liquid non-consumable product contacts the stream of expanding pressurized fluid within the interior cavity.

21. A method of producing a non-consumable frozen product, said method comprising the steps of:
   (a) providing an apparatus according to claim 20;
   (b) releasing a pressurized fluid into the ejector venturi system of the apparatus, wherein the releasing of the pressurized fluid through the nozzle creates negative pressure and the pressurized fluid expands within the interior cavity, thereby causing a rapid drop in temperature of the expanding pressurized fluid; and
   (c) drawing a liquid non-consumable product into the interior cavity of the ejector venturi system through the at least one channel so that the liquid non-consumable product contacts a stream of the expanding pressurized fluid within the interior cavity, thereby yielding the non-consumable frozen product,
   wherein the negative pressure produced by the expanding pressurized fluid creates suction on the at least one channel sufficient to draw the liquid non-consumable product into the interior cavity without the need of gravity or positive pressure,
   wherein the flow of the liquid non-consumable product is regulated by at least one valve coupled to the first end of the at least one channel,
   wherein when the pressurized fluid is released and the liquid non-consumable product is drawn into the interior cavity of the ejector venturi system, the liquid non-consumable product is atomized into droplets upon contact with the expanding pressurized fluid and the atomized droplets are frozen.

22. A non-consumable frozen product produced according to the method of claim 21.

23. The apparatus in accordance with claim 20, wherein the nozzle and the at least one channel of the ejector venturi system are positioned relative to one another so that the liquid non-consumable product contacts the pressurized fluid at the vena contracta of the pressurized fluid as it expands in the interior cavity.

\* \* \* \* \*